(12) United States Patent
Tyler

(10) Patent No.: US 9,493,115 B2
(45) Date of Patent: *Nov. 15, 2016

(54) MONITORING POWERED ASSETS FOR FUELING

(71) Applicant: UNITED PARCEL SERVICE OF AMERICA, INC., Atlanta, GA (US)

(72) Inventor: Daniel Tyler, Louisville, KY (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 216 days.

This patent is subject to a terminal disclaimer.

(21) Appl. No.: 14/504,768

(22) Filed: Oct. 2, 2014

(65) Prior Publication Data

US 2015/0015363 A1   Jan. 15, 2015

Related U.S. Application Data

(63) Continuation of application No. 13/041,005, filed on Mar. 4, 2011, now Pat. No. 8,922,360, which is a continuation of application No. 13/040,877, filed on Mar. 4, 2011, now Pat. No. 8,907,775.

(51) Int. Cl.
| | |
|---|---|
| *G05B 19/00* | (2006.01) |
| *B60Q 9/00* | (2006.01) |
| *G08G 1/00* | (2006.01) |
| *H04W 4/02* | (2009.01) |
| *B67D 7/04* | (2010.01) |
| *B67D 7/34* | (2010.01) |
| *G07C 9/00* | (2006.01) |
| *B60Q 5/00* | (2006.01) |

(52) U.S. Cl.
CPC ............ *B60Q 9/00* (2013.01); *B60Q 5/005* (2013.01); *B67D 7/04* (2013.01); *B67D 7/348* (2013.01); *G07C 9/00007* (2013.01); *G08G 1/207* (2013.01); *H04W 4/021* (2013.01)

(58) Field of Classification Search
CPC ......... B60Q 9/00; B60Q 5/005; G08G 1/207
USPC ...................... 340/450, 450.2, 438, 439, 442
See application file for complete search history.

(56) References Cited

U.S. PATENT DOCUMENTS

| | | |
|---|---|---|
| 5,204,819 A | 4/1993 | Ryan |
| 5,359,522 A | 10/1994 | Ryan |
| 5,923,572 A | 7/1999 | Pollock |
| 6,078,850 A | 6/2000 | Kane et al. |
| 6,116,298 A | 9/2000 | Haimovich et al. |
| 7,555,378 B2 | 6/2009 | Larschan et al. |

(Continued)

OTHER PUBLICATIONS

United States Patent and Trademark Office, Office Action for U.S. Appl. No. 13/040,877, dated Sep. 10, 2013, 13 pages, USA.

(Continued)

*Primary Examiner* — Daryl Pope
(74) *Attorney, Agent, or Firm* — Alston & Bird LLP

(57) ABSTRACT

Systems, methods, apparatus, and computer program products are provided for monitoring powered assets for fueling. For example, in one embodiment, a fuel server can monitor the location of powered assets and fueling units. In response to determining, for example, that a powered asset that needs fuel is within a predetermined geofence defined around a fueling unit, the powered asset can emit a perceivable indication. The powered asset can then be authenticated for receiving fuel from the fueling unit.

18 Claims, 8 Drawing Sheets

(56) References Cited

U.S. PATENT DOCUMENTS

| | | | |
|---|---|---|---|
| 7,774,130 B2 | 8/2010 | Pepper | |
| 7,877,198 B2 | 1/2011 | Tenzer et al. | |
| 8,907,775 B2* | 12/2014 | Tyler | G08G 1/207 340/425.5 |
| 8,922,360 B2* | 12/2014 | Tyler | G08G 1/207 340/438 |
| 2005/0203683 A1 | 9/2005 | Olsen et al. | |
| 2006/0293849 A1 | 12/2006 | Baldwin | |
| 2008/0084324 A1 | 4/2008 | Wallace et al. | |
| 2008/0234888 A1 | 9/2008 | Zanardelli et al. | |
| 2009/0045924 A1 | 2/2009 | Roberts, Sr. et al. | |
| 2011/0080282 A1 | 4/2011 | Kleve et al. | |
| 2012/0223829 A1* | 9/2012 | Tyler | G08G 1/207 340/450.2 |
| 2012/0223830 A1* | 9/2012 | Tyler | G08G 1/207 340/450.2 |

OTHER PUBLICATIONS

United States Patent and Trademark Office, Office Action for U.S. Appl. No. 13/040,877, dated Feb. 24, 2014, 16 pages, USA.
United States Patent and Trademark Office, Office Action for U.S. Appl. No. 13/040,877, dated Jul. 8, 2014, 17 pages, USA.
United States Patent and Trademark Office, Notice of Allowance for U.S. Appl. No. 13/040,877, dated Sep. 10, 2014, 15 pages, USA.
United States Patent and Trademark Office, Office Action for U.S. Appl. No. 13/041,005, dated Oct. 23, 2013, 7 pages, USA.
United States Patent and Trademark Office, Office Action for U.S. Appl. No. 13/041,005, dated Jun. 19, 2014, 10 pages, USA.
United States Patent and Trademark Office, Notice of Allowance for U.S. Appl. No. 13/041,005, dated Sep. 15, 2014, 5 pages, USA.
United States Patent and Trademark Office, Office Action for U.S. Appl. No. 14/504,797, May 5, 2016, 12 pages, U.S.A.

* cited by examiner

MONITORING POWERED ASSETS FOR FUELING

CROSS-REFERENCE TO RELATED APPLICATIONS

This application is a continuation of U.S. application Ser. No. 13/041,005 filed Mar. 4, 2011, which is a continuation of U.S. application Ser. No. 13/040,877 filed Mar. 4, 2011, which are hereby incorporated herein in their entireties by reference.

BACKGROUND

Transportation and logistics companies often maintain large fleets of vehicles and ground support equipment for daily use in their operations. As part of their operations, such vehicles and equipment need to be easily located, maintained, and fueled at certain times and/or intervals. Thus, a need exists for increasing the efficiency of operations for fleet vehicles and other support equipment.

SUMMARY

In general, embodiments of the present invention provide systems, methods, apparatus, and computer program products for monitoring powered assets for fueling.

In one aspect, a method for monitoring powered assets for fueling is provided. In one embodiment, the method comprises (1) defining a geofence around a mobile fueling unit; (2) receiving location data from a powered asset computing device associated with a powered asset, wherein the location data substantially identifies the location of the powered asset; (3) determining whether the powered asset is at least partially within the geofence defined around the mobile fueling unit; and (4) after determining that the powered asset is at least partially within the geofence defined around the mobile fueling unit, generating a command to cause the powered asset to emit a perceivable indication.

In another aspect, another method for monitoring powered assets for fueling is provided. In one embodiment, the method comprises (1) defining a geofence around a powered asset; (2) receiving, via the one or more processors, location data from a mobile fueling unit computing device associated with a mobile fueling unit, wherein the location data substantially identifies the location of the mobile fueling unit; (3) determining whether the mobile fueling unit is at least partially within the geofence defined around the powered asset; and (4) after determining that the mobile fueling unit is at least partially within the geofence defined around the powered asset, generating a command to cause the powered asset to emit a perceivable indication.

In yet another aspect, a system comprising one or more memory storage areas and one or more processors is provided. In one embodiment, the system is configured to (1) define a geofence around a mobile fueling unit; (2) receive location data from a powered asset computing device associated with a powered asset, wherein the location data substantially identifies the location of the powered asset; (3) determine whether the powered asset is at least partially within the geofence defined around the mobile fueling unit; and (4) after determining that the powered asset is at least partially within the geofence defined around the mobile fueling unit, generate a command to cause the powered asset to emit a perceivable indication.

In still another aspect, a system comprising one or more memory storage areas and one or more processors is provided. In one embodiment, the system is configured to (1) define a geofence around a powered asset; (2) receive location data from a mobile fueling unit computing device associated with a mobile fueling unit, wherein the location data substantially identifies the location of the mobile fueling unit; (3) determine whether the mobile fueling unit is at least partially within the geofence defined around the powered asset; and (4) after determining that the mobile fueling unit is at least partially within the geofence defined around the powered asset, generate a command to cause the powered asset to emit a perceivable indication.

In another aspect, another method for authenticating powered assets for fueling is provided. In one embodiment, the method comprises (1) providing a unique identifier associated with a fueling unit to a data receptacle associated with a powered asset from physical contact of a data carrier associated with the fueling unit with the data receptacle; (2) after the unique identifier is provided, determining whether the powered asset associated with a powered asset identifier is authorized to receive fuel; and (3) after determining that the powered asset associated with the powered asset identifier is authorized to receive fuel, transmitting a notification indicating that the powered asset is authorized to receive fuel.

In yet another aspect, a system comprising a fuel server, a fueling unit computing device associated with a fueling unit, and a powered asset computing device associated with a powered asset is provided. In one embodiment, the system is configured to (1) provide a unique identifier associated with a fueling unit to a data receptacle associated with a powered asset from physical contact of a data carrier associated with the fueling unit with the data receptacle; (2) after the unique identifier is provided, determine whether the powered asset associated with a powered asset identifier is authorized to receive fuel; and (3) after determining that the powered asset associated with the powered asset identifier is authorized to receive fuel, transmit a notification indicating that the powered asset is authorized to receive fuel.

BRIEF DESCRIPTION OF THE SEVERAL VIEWS OF THE DRAWING(S)

Reference will be made to the accompanying drawings, which are not necessarily drawn to scale, and wherein.

DETAILED DESCRIPTION

Figure 1:
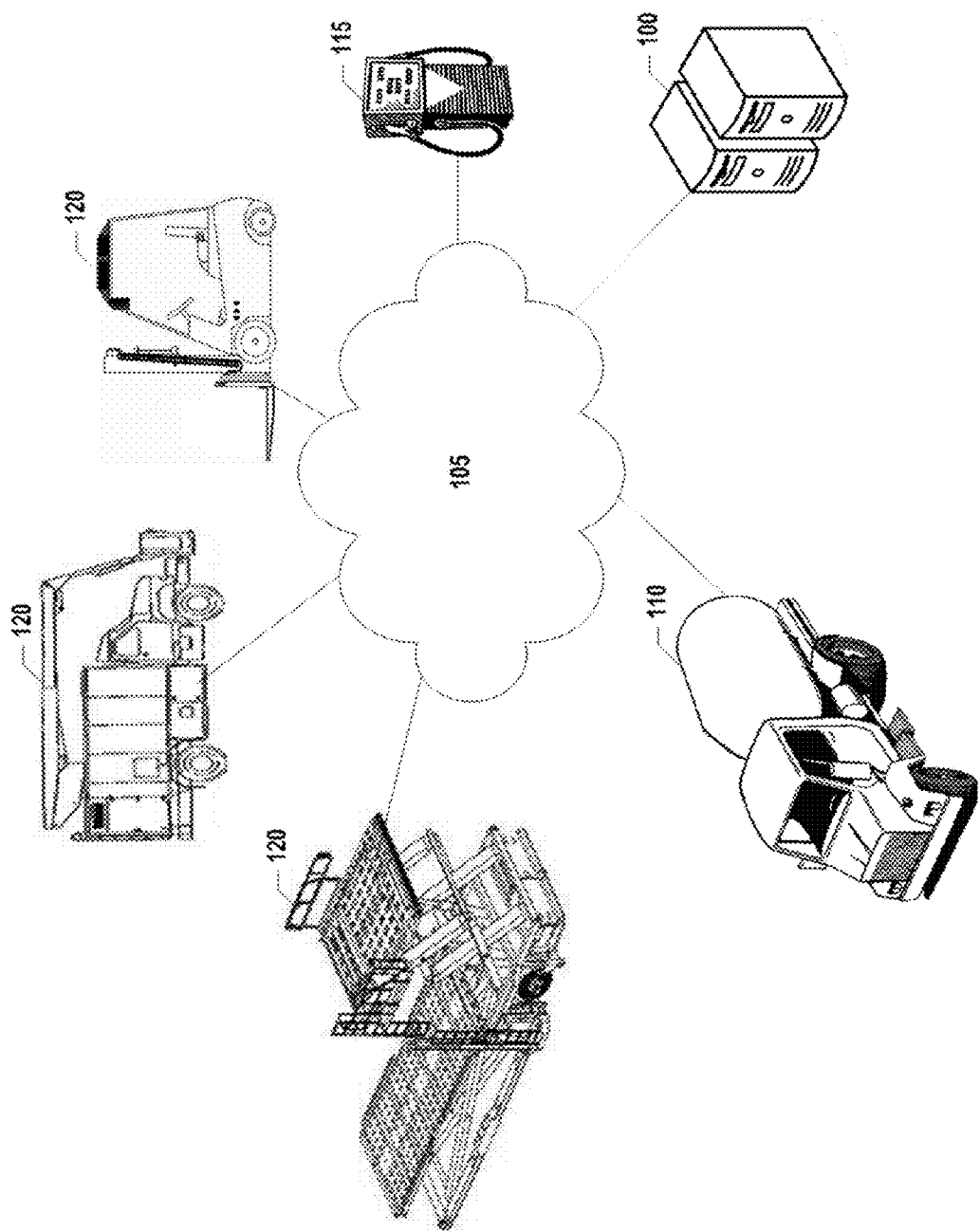
FIG. 1 is one type of system that can be used to practice embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout. The term "exemplary" is used to be an example with no indication of quality level.

I. Methods, Apparatus, Systems, and Computer Program Products

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. Exemplary System Architecture

FIG. 1 provides an illustration of a system that can be used in conjunction with various embodiments of the present invention. As shown in FIG. 1, the system may include one or more fuel servers 100, one or more networks 105, one or more mobile fueling units 110, one or more fixed fueling units 115, and one or more powered assets 120. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, stand-alone entities, the various embodiments are not limited to this particular architecture.

a. Exemplary Fuel Server

Figure 2:
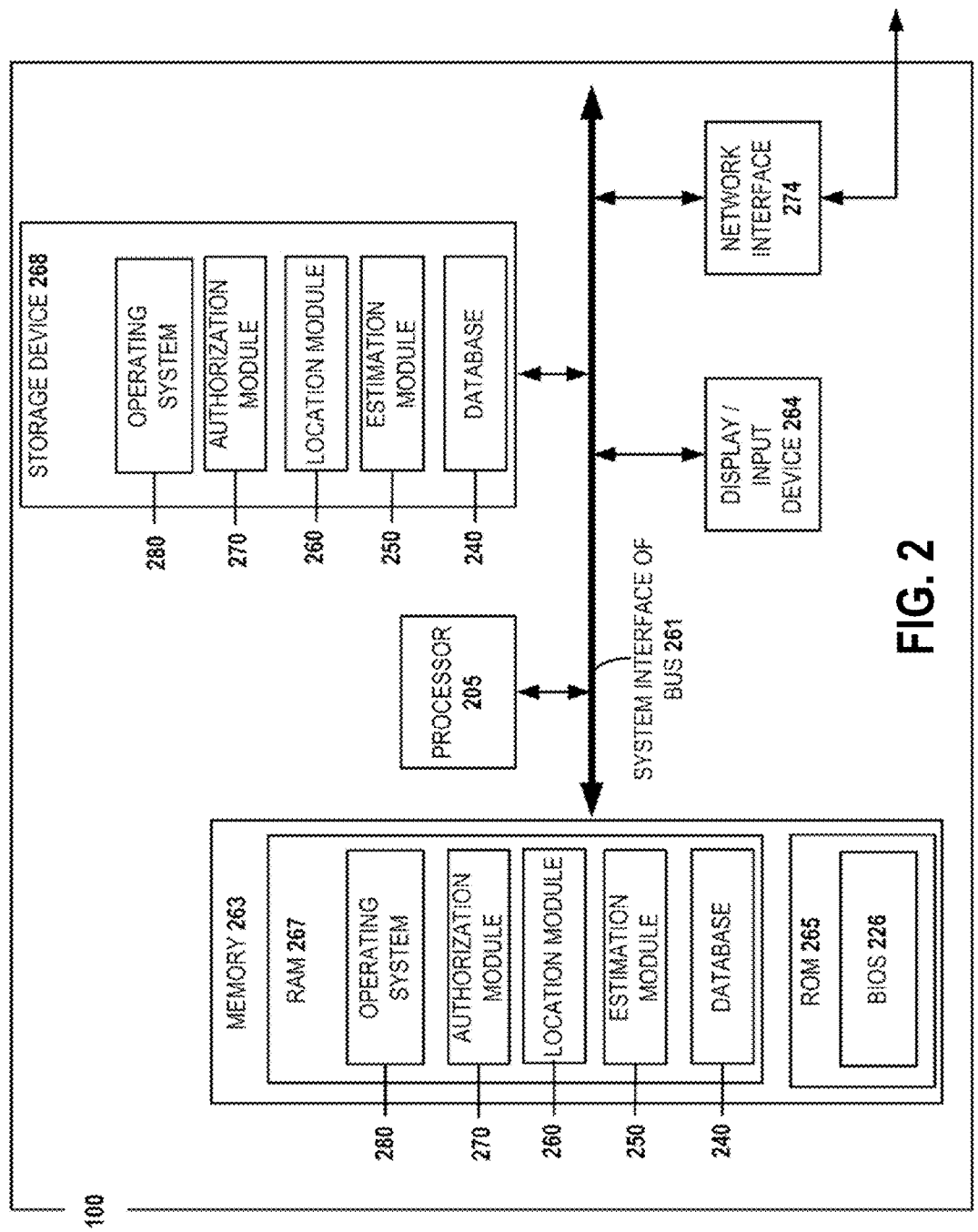
FIG. 2 is a schematic of an entity capable of operating as a fuel server in accordance with embodiments of the present invention.

FIG. 2 provides a schematic of a fuel server 100 according to one embodiment of the present invention. In general, the term "server" may refer to, for example, any computer, computing device, desktop, notebook or laptop, distributed system, server, blade, gateway, switch, processing device, or combination of processing devices adapted to perform the functions described herein. As will be understood from this figure, in one embodiment, the fuel server 100 includes a processor 205 that communicates with other elements within the fuel server 100 via a system interface or bus 261. The processor 205 may be embodied in a number of different ways. For example, the processor 205 may be embodied as a processing element, a coprocessor, a controller, or various other processing devices including integrated circuits such as, for example, an application specific integrated circuit (ASIC), a field programmable gate array (FPGA), a hardware accelerator, or the like.

In an illustrative embodiment, the processor 205 may be configured to execute instructions stored in the device memory or otherwise accessible to the processor 205. As such, whether configured by hardware or software methods, or by a combination thereof, the processor 205 may represent an entity capable of performing operations according to embodiments of the present invention when configured accordingly. A display device/input device 264 for receiving and displaying data may also be included in the fuel server 100. This display device/input device 264 may be, for example, a keyboard or pointing device that is used in combination with a monitor. The fuel server 100 may further include memory 263 (transitory and non-transitory memory), such as read only memory (ROM) 265 and random access memory (RAM) 267. The fuel server's ROM 265 may be used to store a basic input/output system (BIOS) 226 containing the basic routines that help to transfer information to the different elements within the fuel server 100.

In addition, in one embodiment, the fuel server 100 may include at least one storage device 268, such as a hard disk drive, a CD drive, and/or an optical disk drive for storing information on various computer-readable media. The storage device(s) 268 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disks, or the like. Additionally, each of these storage devices 268 may be connected to the system bus 261 by an appropriate interface.

Furthermore, a number of program modules may be stored by the various storage devices 268 and/or within RAM 267. Such program modules may include an operating system 280, an authorization module 270, a location module 260, and a estimation module 250. As described in more detail below, these modules may control certain aspects of the operation of the fuel server 100 with the assistance of the processor 205 and operating system 280—although their functionality need not be modularized. In addition to the program modules, the fuel server 100 may include or be in communication with one or more databases (e.g., database 240) or one or more database servers.

Also located within the fuel server 100, in one embodiment, is a network interface 274 for interfacing with various computing entities. This communication may be via the same or different wired or wireless networks (or a combination of wired and wireless networks), as described above. For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the fuel server 100 may be configured to communicate via wireless external communication networks using any of a variety of protocols, such as 802.11, general packet radio service (GPRS), wideband code division multiple access (W-CDMA), Long Term Evolution (LTE), IEEE 802.11 (Wi-Fi), 802.16 (WiMAX), ultra wideband (UWB), and/or any other wireless protocol. Via such communications, the fuel server 100 may be able to communication with, for example, mobile fueling units 110 (e.g., mobile fueling unit computing devices and/or mobile fueling unit telematics devices), fixed fueling units 115 (e.g., fixed fueling unit computing devices), and/or powered assets 120 (e.g., powered asset computing devices and/or powered asset telematics devices).

It will be appreciated that one or more of the fuel server's 100 components may be located remotely from other fuel server 100 components. Furthermore, one or more of the components may be combined and additional components performing functions described herein may be included in the fuel server 100.

b. Exemplary Powered Asset

As indicated in FIG. 1, one or more powered assets 120 may be used with embodiments of the present invention. The term powered asset may refer to any unit that uses fuel, such as air compressors, vans, flatbed trucks, aircraft-pushback tractors, mobile fueling units, belt loaders, cargo loaders, deicers, forklifts, fuel carts, generators, ground-power units, portable lights, boom lifts, single position loaders, and/or the like. In one embodiment, each powered asset may be associated with a unique identifier (such as a powered asset ID) that uniquely identifies the powered asset 120. The unique powered asset ID may include characters, such as numbers, letters, symbols, and/or the like.

Figure 3:
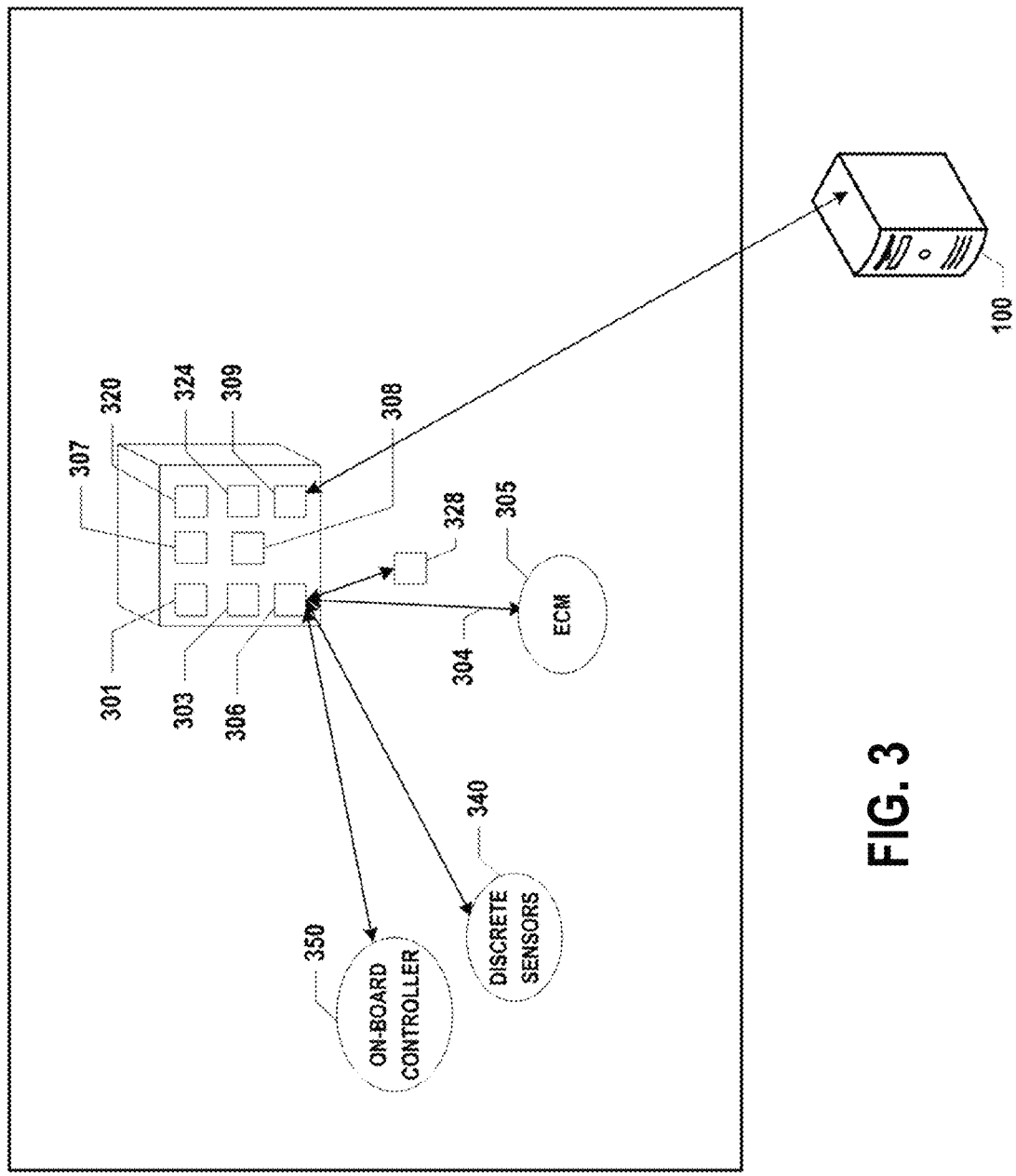
FIG. 3 is a block diagram of a telematics device which may be used to collect data in association with embodiments of the present invention.

In one embodiment, each powered asset 120 may include sensors installed on or about the powered asset 120 and/or a telematics device (shown in FIG. 3). The telematics device may collect powered asset 120 telematics data and transmit the data to the fuel server 100, fixed fueling units 115 (e.g., fixed fueling unit computing devices), and/or mobile fueling units 110 (e.g., mobile fueling unit computing devices and/or a mobile fueling unit telematics devices) via one of several communication methods. To achieve this functionality, the telematics device may include a processor 301, discrete sensors 340, a real-time clock 303, J-Bus protocol architecture 304, an electronic control module (ECM) 305, a port 306 for receiving data from discrete sensors 340 in a powered asset 120, a communication port 307, a radio frequency identification (RFID) tag 328, a power source 308, a data radio 309 for communication with a variety of communication networks, memory modules 320, and a programmable logic controller (PLC) 324. In an alternative embodiment, many of these components may be located in the powered asset 120 but external to the telematics device.

In one embodiment, the discrete sensors 340 may collect telematics data via various sensors, such as engine sensors, powered asset description sensors, mobile fueling unit description sensors, fixed fueling unit description sensors, motion/accelerometer sensors, ignition sensors, environmental sensors, temperature sensors, tire pressure sensors, oil pressure sensors, fuel sensors, horn sensors, light sensors, location sensors (e.g., global position system (GPS) sensors), weight sensors, brake sensors, door sensors, battery sensors, bridge sensors, platform sensors, belt sensors, fault sensors, speed sensors, and/or other sensors. It should be noted that not all powered assets necessarily have the same capabilities. For example, in one embodiment, a powered asset 120 (e.g., flatbed truck) may have a fuel sensor or otherwise provide an indication regarding the amount of fuel remaining in the truck's fuel tank. However, other powered assets 120 (e.g., generators) may not have such capabilities.

In one embodiment, the location sensor, which may be one of several components available in the telematics device, may be compatible with a low Earth orbit (LEO) satellite system or a Department of Defense (DOD) satellite system. Alternatively, triangulation may be used in connection with a device associated with a particular powered asset 120 and/or the powered asset's driver and with various communication points (e.g., cellular towers or Wi-Fi access points) positioned at various locations throughout a geographic area to determine the location of the powered asset 120. The location sensor may be used to receive position, time, and speed data. The location sensor may also allow the telematics device to communicate with the fuel server 100 or with a similar entity. More than one location sensor may be utilized, and similar techniques may likewise be used to collect geo-location information associated with the powered asset 120.

In one embodiment, the ECM 305 may be one of several components available in the telematics device. The ECM 305, which may be a scalable and subservient device to the telematics device, may have data processing capability to decode and store analog and digital inputs from powered asset systems and sensors 340. The ECM 305 may further have data processing capability to collect and present powered asset data to the J-Bus 304 (which may allow transmission to the telematics device), and output standard powered asset diagnostic codes when received from a powered asset's J-Bus-compatible on-board controllers 350 or sensors 340.

In one embodiment, a communication port 307 may be one of several components available in the telematics device. Embodiments of the communication port 307 may include an Infrared Data Association (IrDA) communication port, a data radio, and/or a serial port. The communication port 307 may receive instructions for the telematics device. These instructions may be specific to the powered asset 120 in which the telematics device is installed, specific to the geographical area in which the powered asset 120 will be located, or specific to the function the powered asset 120 serves within the fleet.

In one embodiment, a radio frequency identification (RFID) tag 328 may be one of several components available for use with the telematics device. One embodiment of the RFID tag 328 may include an active RFID tag, which comprises at least one of the following: (1) an internal clock; (2) a memory; (3) a microprocessor; and (4) at least one input interface for connecting with sensors located in the powered asset 120 or the telematics device. Another embodiment of the RFID tag 328 may be a passive RFID tag.

In one embodiment, the data radio 309 may be one of several components available in the telematics device. The data radio 309 may be configured to communicate with a wireless wide area network (WWAN), wireless local area network (WLAN), or wireless personal area network (WPAN), or any combination thereof. In one embodiment, a WPAN data radio provides connectivity between the telematics device and peripheral devices used in close proximity to the powered asset 120, such as the fuel server 100, fixed fueling units 115 (e.g., fixed fueling unit computing devices), and/or mobile fueling units 110 (e.g., mobile fueling unit computing devices and/or mobile fueling unit telematics devices). Via the data radio 309, for example, the telematics device may transmit some or all of the telematics data, via any suitable wired or wireless communication network 105, to the fuel server 100, a fixed fueling unit 115 (e.g., a fixed fueling unit computing device), and/or a mobile fueling unit 110 (e.g., a mobile fueling unit computing device and/or a mobile fueling unit telematics device).

Figure 4:
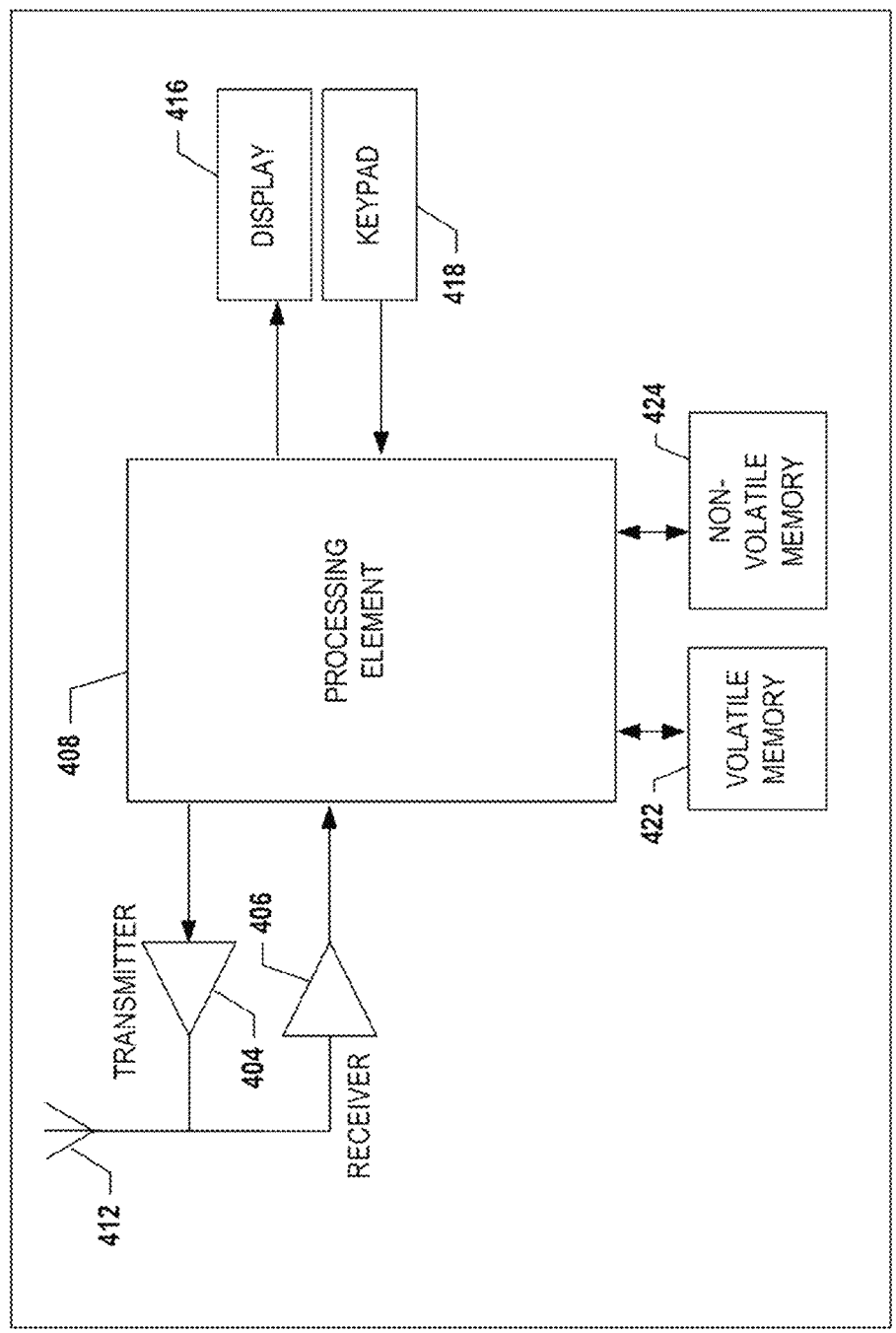
FIG. 4 is a schematic of an entity capable of operating as a computing device in accordance with embodiments of the present invention.

In one embodiment, powered assets 120 may also include a computing device that is able to communicate with the telematics device, the fuel server 100, fixed fueling units 115 (e.g., fixed fueling unit computing devices), and/or mobile fueling units 110 (e.g., mobile fueling unit computing devices and/or a mobile fueling unit telematics devices). The term computing device is used generically to refer to any entity capable of performing some of the functions described herein, such as the one shown in FIG. 4. For example, a powered asset computing device may include components such as (1) processing elements 408, (2) memory 422, 424, (3) network interfaces, (4) transmitters 404, (5) receivers 406, (6) antennae 412, (7) displays 416, (8) keypads 418, and/or (9) various other components.

Figure 6A:
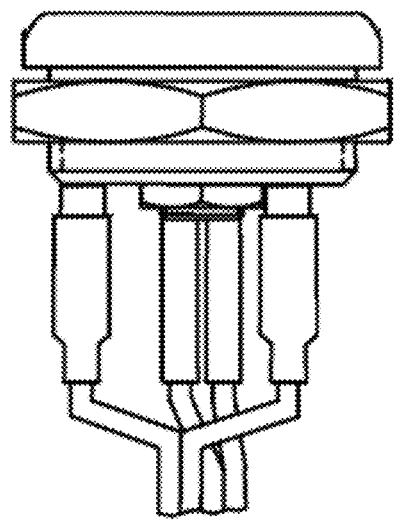
FIGS. 6A and 6B are data receivers/receptacles that can be used in accordance with embodiments of the present invention.
Figure 6B:
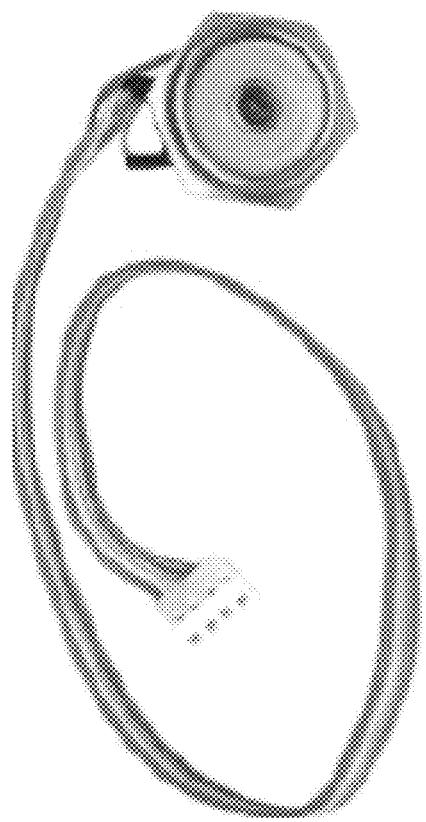

In one embodiment, each powered asset may include and/or be associated with a data receiver/receptacle (e.g., the data receiver/receptacle may be attached thereto or associated therewith). In one embodiment, the data receiver/receptacle may be an iButton receiver or Dallas Key receiver. The data receiver/receptacle can be mounted virtually anywhere on or close to the powered asset 120, such as being affixed near the fuel tank and/or the like. As shown in FIGS. 6A and 6B, the data receiver/receptacle may be in communication with, for example, a universal serial bus (USB), serial port, and/or parallel-port 1-Wire adapter. Through such capabilities, the data receiver/receptacle can receive data (e.g., a data carrier ID, a mobile fueling unit ID, and/or a fixed fueling unit ID) from a data carrier and transmit the same to a powered asset 120 (e.g., to a powered asset computing device and/or a powered asset telematics device).

In one embodiment, each powered asset 120 may have the capability to emit perceivable indications. For example, a powered asset 120 may have a beacon (e.g., a light) affixed thereto that is illuminated when, for example, the powered asset's 120 engine is active. Similarly, powered assets 120 may be able to cause their lights to flash, cause their horns to honk, and/or the like in response to (e.g., after) receiving instructions from, for example, the fuel server 100, fixed fueling units 115 (e.g., fixed fueling unit computing devices), and/or the mobile fueling units 110 (e.g., from mobile fueling unit computing devices and/or a mobile fueling unit telematics devices).

c. Exemplary Mobile Fueling Unit

As indicated in FIG. 1, one or more mobile fueling units 110 may be used with embodiments of the present invention. The term mobile fueling unit may refer to any mobile unit that dispenses fuel. For example, the term mobile fueling unit may refer to fueling tanker trucks, aircraft mobile fueling units, portable fuel karts, and/or the like. The mobile fueling units 110 can be used to deliver fuel (e.g., various types of fuel including bio-diesel mixtures) to powered assets 120. Similar to powered assets 120, each mobile fueling unit 110 may be associated with a unique identifier (such as a mobile fueling unit ID) that uniquely identifies the mobile fueling unit 110. The unique mobile fueling unit ID may include characters, such as numbers, letters, symbols, and/or the like.

In one embodiment, each mobile fueling unit 110 may include sensors installed on or about the mobile fueling unit 110 and/or a telematics device (similar to that shown in FIG. 3). The telematics device may collect mobile fueling unit 110 telematics data and transmit the telematics data to the fuel server 100, fixed fueling units 115 (e.g., fixed fueling unit computing devices), and/or powered assets 120 (e.g., powered asset computing devices and/or a powered asset telematics devices) via one of several communication methods. For example, the telematics device may include a processor, discrete sensors, a real-time clock, J-Bus protocol architecture, an ECM, a port for receiving data from discrete sensors in a mobile fueling unit 110, a communication port, an RFID tag, a power source, a data radio for communication with a variety of communication networks, memory modules, and a PLC (and function as described with respect to the powered asset 120). In an alternative embodiment, many of these components may be located in the mobile fueling unit 110 but external to the telematics device. In one embodiment, the discrete sensors may include various sensors, such as those described above with respect to the powered asset 120.

In one embodiment, each mobile fueling unit 110 may be capable of dispensing fuel to powered assets 120 from one or more nozzles simultaneously. Each nozzle may be powered by separate pumps. Moreover, in one embodiment, each mobile fueling unit 110 may include electronic pulsers, for example, to measure the fuel flow into or out of the corresponding fuel tank.

In one embodiment, each mobile fueling unit 110 may also include a computing device that is able to communicate with the telematics device, the fuel server 100, fixed fueling units 115 (e.g., fixed fueling unit computing devices), and/or the powered assets 120 (e.g., a powered asset computing device and/or a powered asset telematics device). The term computing device is used generically to refer to any entity capable of performing some of the functions described herein. For example, a mobile fueling unit computing device may include components such as (1) processing elements, (2) memory, (3) network interfaces, (4) transmitters, (5) receivers, (6) antennae, (7) displays, (8) keypads (or other input mechanisms), and/or (9) various other components (such as those shown in FIG. 4).

Figure 5A:
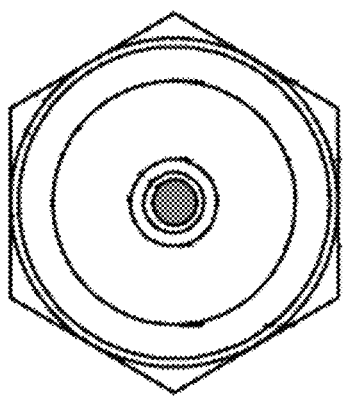
FIGS. 5A and 5B are data carriers that can be used in accordance with embodiments of the present invention.
Figure 5B:
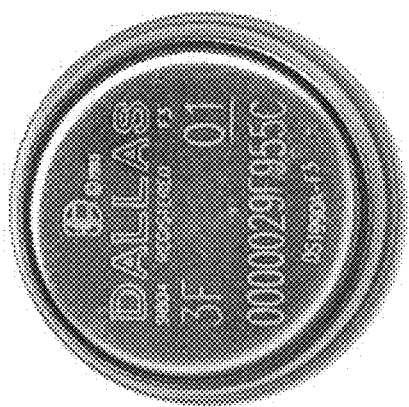

In one embodiment, each mobile fueling unit 110 may include and/or be associated with a data carrier (e.g., the data carrier may be attached thereto or associated therewith). As shown in FIGS. 5A and 5B, a data carrier may comprise a ROM function control unit that includes an interface and logic to implement ROM function commands. In one embodiment, the data carrier may store a unique data carrier identifier. In a particular embodiment, the data carrier ID may simply be associated with a mobile fueling unit ID or a fixed fueling unit ID. In another embodiment, the unique data carrier identifier may be a mobile fueling unit ID or a fixed fueling unit ID. In a particular embodiment, the data carrier may be an iButton or Dallas Key. As shown in FIGS. 5A and 5B, the data carrier may be enclosed in a stainless steel can, for example. Similarly, the data carrier can be mounted virtually anywhere on or associated with a mobile fueling unit 110 and/or a fixed fueling unit 115, such as hanging from a nozzle, attached to a key ring for a mobile fueling unit 110, and/or the like. Through these components, the data carrier can transmit data (e.g., a data carrier ID and/or a mobile fueling unit ID) to a data receiver/receptacle.

d. Exemplary Fixed Fueling Unit

As indicated in FIG. 1, one or more fixed fueling units 115 may be used with embodiments of the present invention. Fixed fueling units 115 can be used to deliver fuel (e.g., various types of fuel including bio-diesel mixtures) to powered assets 120. Similar to powered assets 120 and mobile fueling units 110, each fixed fueling unit 115 may be associated with a unique ID (such as a fixed fueling unit ID) that uniquely identifies the fixed fueling unit 115. The unique fixed fueling unit ID may include characters, such as numbers, letters, symbols, and/or the like.

In one embodiment, each fixed fueling unit 115 may be capable of dispensing fuel to powered assets 120 from one or more nozzles simultaneously. Each nozzle may be powered by separate pumps. Moreover, in one embodiment, each fixed fueling unit 115 may include electronic pulsers, for example, to measure the fuel flow into or out of the corresponding fuel tank.

In one embodiment, the fixed fueling unit 115 may also include a computing device that is able to communicate with the fuel server 100, powered assets 120 (e.g., powered asset computing devices and/or powered asset telematics devices), and/or mobile fueling units 110 (e.g., mobile fueling unit computing devices and/or mobile fueling units telematics devices). The term computing device is used generically to refer to any entity capable of performing some of the functions described herein. For example, a mobile fueling unit computing device may include components such as (1) processing elements, (2) memory, (3) network interfaces, (4) transmitters, (5) receivers, (6) antennae, (7) displays, (8) keypads (or other input mechanisms), and/or (9) various other components (such as those shown in FIG. 4).

In one embodiment, each or fixed fueling unit 115 may include and/or be associated with a data carrier (e.g., the data carrier may be attached thereto or associated therewith)—similar to that described above with respect to the mobile fueling unit 110. Through these components, the data carrier can transmit data (e.g., a data carrier ID and/or a fixed fueling unit ID) to a data receiver/receptacle.

III. Exemplary System Operation

Figure 7:
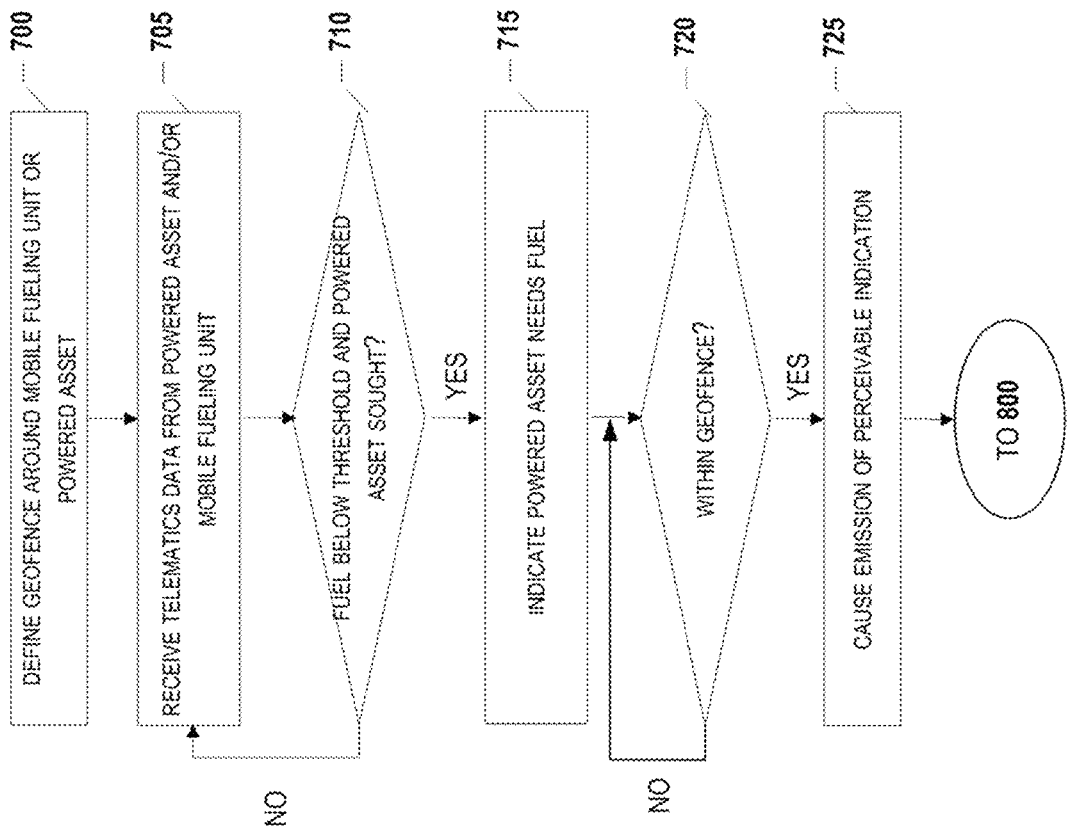
FIGS. 7-8 are flowcharts illustrating operations and processes that can be used in accordance with various embodiments of the present invention.
Figure 8:
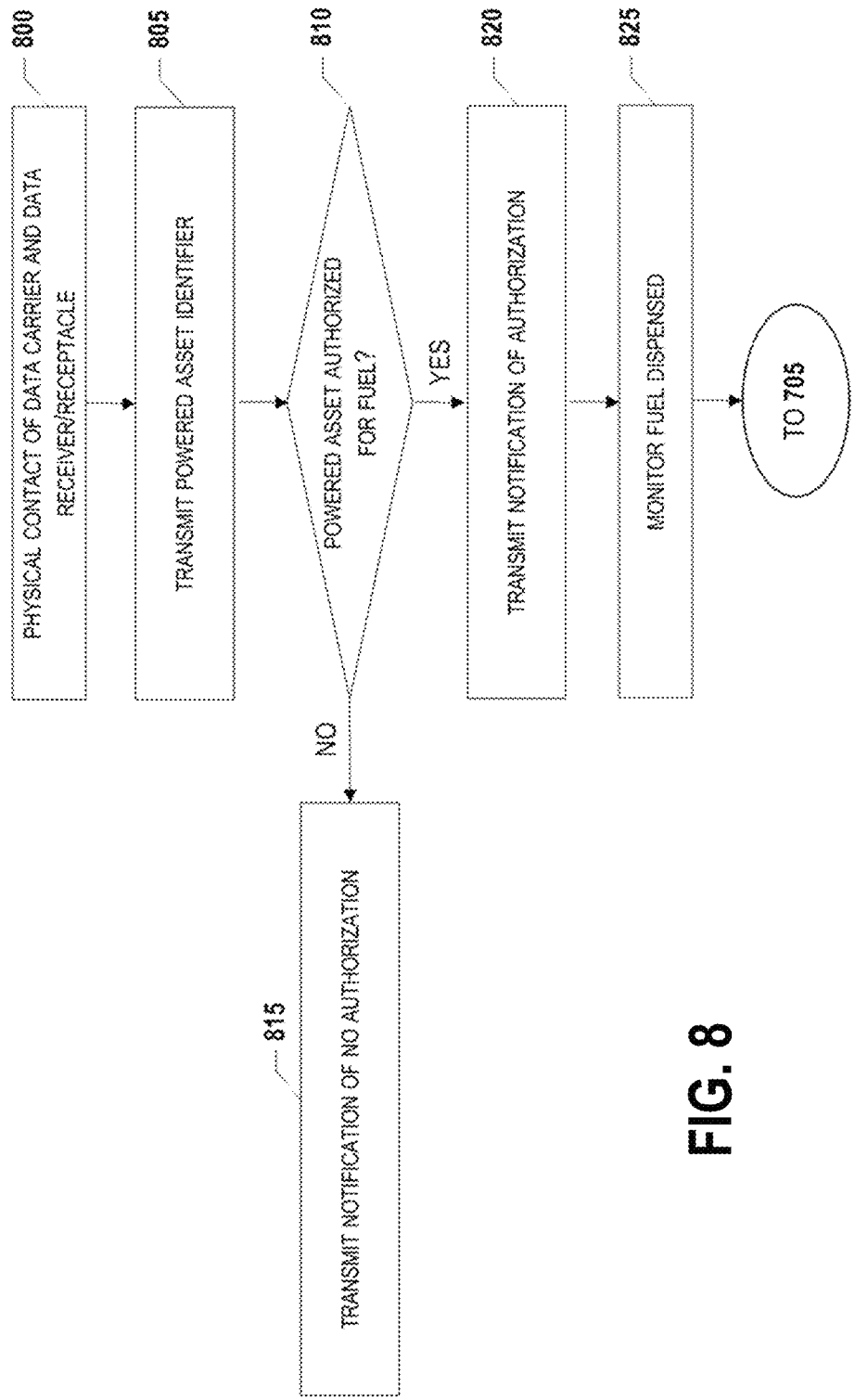

Reference will now be made to FIGS. 7-8. FIGS. 7-8 illustrate operations and processes that can be performed for monitoring powered assets for fueling.

a. Defining Geofences

Embodiments of the present invention may involve defining geofences substantially around fueling units (e.g., mobile fueling units 110 and/or fixed fueling units 115). For example, the fuel server 100 may define a geofence substantially around each mobile fueling unit 110 and/or fixed fueling unit 115 (Block 700 of FIG. 7). Additionally or alternatively, the fuel server 100 may define a geofence substantially around each powered asset 120 (Block 700 of FIG. 7).

A geofence may be defined, for example, based on longitude and latitude coordinates of the center, as well as the radius, of the location of a fueling unit (e.g., mobile fueling unit 110 and/or fixed fueling unit 115) or a powered asset 120. For instance, a geofence may define an area of about 300 feet in radius around a fueling unit or powered asset 120. For a fueling unit, the radius of the geofence may correspond to the length of the fueling unit's shortest fuel hose. A geofence may be any shape including, but not limited to, a circle, square, rectangle, an irregular shape, and/or the like. Moreover, the various geofences need not be the same shape or size. Accordingly, any combination of shapes and sizes may be used in accordance with embodiments of the present invention. Similarly, a geofence may overlap or reside wholly within another geofence.

Once a geofence has been defined for a fueling unit (e.g., mobile fueling unit 110 and/or fixed fueling unit 115) or a powered asset 120, the size and shape of the geofence (or similar means for defining the geofence) may be stored in a database associated with, for example, the corresponding fueling unit ID and/or powered asset ID. Accordingly, as mobile fueling units 110 and powered assets 120 change locations, the fuel server 100 can trigger certain events based their locations and activities associated with their geofences. To do so, each mobile fueling unit 110 (e.g., mobile fueling unit computing device and/or mobile fueling unit telematics device) and/or powered asset 120 (e.g., powered asset computing device and/or powered asset telematics device) may transmit telematics data (e.g., location data) to the fuel server 100 at regular or periodic intervals. For example, a powered asset 120 (e.g., powered asset computing device and/or powered asset telematics device) may transmit its longitude and latitude coordinates and powered asset ID to the fuel server 100 every ten seconds as it moves around, but such transmissions can be scaled back in the event no movement has occurred since the last transmission. Thus, as a mobile fueling unit's 110 location changes, for example, the corresponding geofence will move as well.

In one embodiment, in response to (e.g., after) a determination that a fueling unit and/or powered asset 120 has entered or exited a defined geofence, the fuel server 100 can automatically trigger one or more events.

b. Monitoring Fuel Consumption

In one embodiment, fuel levels and fuel consumption of powered assets 120 can be monitored by the fuel server 100.

1. Estimating Fuel Consumption

In one embodiment, certain powered assets 120 may be unsophisticated units, such as air compressors, belt loaders, cargo loaders, generators, ground-power units, portable lights, boom lifts, and single position loaders. Some of these powered assets 120 may not have the capability to determine their fuel levels and/or determine the amount of fuel they have consumed over a period of time (e.g., minutes, hours, days, and/or weeks). Thus, in certain embodiments, the fuel server 100 can monitor these powered assets 120 to estimate the amount of fuel consumed and/or remaining in their respective fuel tanks. To do so, in one embodiment, the fuel server 100 can store data associated with each powered asset 120. For example, the data stored by the fuel server 100 (e.g., a database) for each powered asset 120 may include a powered asset ID, a fuel tank size, historical fuel usage based on previous fill-up quantities, date and time of the last fill up, runtime information, miles driven since last the fill up, and/or the like. Such data may be updated on a routine, periodic, and/or continuous basis. Moreover, the fuel server 100 (e.g., a database) may store a definition file of fuel threshold triggers for each powered asset 120 that indicates, for example, when the powered asset 120 needs to be fueled, e.g., ½ or ¼ tank remaining.

To estimate the fuel consumption and/or fuel remaining, the fuel server 100 can receive telematics data from powered assets 120, for example, as they operate. In one embodiment, a powered asset 120 (e.g., powered asset computing device and/or powered asset telematics device) may provide telematics data to the fuel server 100 in response to (e.g., after) predetermined triggers and/or at periodic intervals (Block 705 of FIG. 7). For instance, each time a powered asset's 120 engine is turned on or off, the powered asset 120 (e.g., powered asset computing device and/or powered asset telematics device) may transmit telematics data to the fuel server 100. Additionally or alternatively, a powered asset 120 (e.g., powered asset computing device and/or powered asset telematics device) may be configured to transmit appropriate telematics data to the fuel server 100 on a routine, periodic, and/or continuous basis. The telematics data may include data collected from various sensors, such as engine sensors, ignition sensors, location sensors, brake sensors, battery sensors, and/or the like.

In one embodiment, from the telematics data, the fuel server 100 may be able determine an estimated amount of fuel consumed by a powered asset 120 and/or an estimated amount of fuel remaining in a powered asset's 120 fuel tank. To do so, from the telematics data, the fuel server 100 may be able to determine (a) the number of hours a powered asset's 120 engine has run during a day or week, (b) the distance traversed by a powered asset 120 in a day (e.g., via GPS or other telemetry location services, such as cellular assisted GPS or real time location system or server technology using received signal strength indicators from a Wi-Fi network), (c) the amount of fuel used in the past for similar activities, and/or (d) the like. In another embodiment, the fuel server 100 may query powered assets 120 that can provide an indication of current fuel levels. Thus, based in part on such data, the fuel server 100 can determine an estimated amount of fuel consumed by a powered asset 120 and/or an estimated amount of fuel remaining in a powered asset's 120 fuel tank (Block 710 of FIG. 7).

In one embodiment, if telematics data is unavailable, the fuel server 100 may be able determine an estimated amount of fuel consumed by a powered asset 120 and/or an estimated amount of fuel remaining in a powered asset's 120 fuel tank based on the powered asset's 120 anticipated workload. For example, with the information regarding how the powered asset 120 will be used during the day, the fuel server 100 can estimate, for example, the number of miles likely traversed by the powered asset 120 and/or the powered engine's estimated runtime over a period of time. Using such estimations, the fuel server 100 can determine an estimated amount of fuel consumed by a powered asset 120 and/or an estimated amount of fuel remaining in a powered asset's 120 fuel tank (Block 710 of FIG. 7).

In one embodiment, each time a powered asset 120 receives fuel, the fuel tank may be filled up to preserve the accuracy of such determinations. Thus, when a powered asset 120 is fueled, its fuel tank is "topped off" so the fuel server 100 can automatically reset the data used for determining an estimated amount of fuel consumed by the powered asset 120 and/or an estimated amount of fuel remaining in the powered asset's 120 fuel tank.

In one embodiment, in response to (e.g., after) the fuel server 100 determining that an estimated fuel level in a fuel tank of a powered asset 120 is below a predetermined threshold (e.g., fuel threshold trigger), the fuel server 100 may indicate that the powered asset 120 needs to be fueled (Block 715 of FIG. 7). Indicating that the powered asset 120 needs to be fueled may take a variety of forms. For example, the fuel server 100 may logically place the powered asset 120 (e.g., the powered asset ID) in a fueling queue of units that need to be fueled. The fuel server 100 may also transmit a notification to the powered asset 120 (e.g., powered asset computing device and/or powered asset telematics device) for display to the operator. With such information, the operator may take the powered asset to a fueling unit to receive fuel. Similarly, the fuel server 100 may transmit a notification to a fueling unit (e.g., fueling unit computing device) for display to the operator. With such information, the operator may proceed to identify the powered asset 120 to fuel the same. As will be recognized, a variety of other techniques and approaches may be used.

2. Receiving Fuel Data

In one embodiment, certain powered assets 120 may be sophisticated units, such as vans, flatbed trucks, aircraft-pushback tractors, mobile fueling units, and/or the like. Some of these powered assets 120 may have the capability to determine their fuel levels and/or determine the amount of fuel they have consumed. Thus, in certain embodiments, some powered assets 120 (e.g., powered asset computing devices and/or powered asset telematics devices) may provide telematics data (e.g., fuel data), for example, to the fuel server 100 in response to (e.g., after) various predetermined triggers and/or at periodic intervals. For example, each time the fuel level in a powered asset's 120 fuel tank falls below a predetermined threshold (e.g., fuel threshold trigger), the powered asset 120 (e.g., powered asset computing device and/or powered asset telematics device) may transmit telematics data (e.g., fuel data) to the fuel server 100. The telematics data may include a variety of data, such as the amount of fuel left in the fuel tank, the amount of fuel consumed, engine run-time data, location data, and/or the like. Additionally or alternatively, a powered asset 120 (e.g., powered asset computing device and/or powered asset telematics device) may be configured to transmit telematics data (e.g., fuel data) to the fuel server 100 on a routine, periodic, and/or continuous basis. As will be recognized, various approaches and techniques can be used to adapt to a variety of needs.

In one embodiment, in response to (e.g., after) the fuel server 100 determining that an estimated fuel level in a fuel tank of a powered asset 120 is below a predetermined threshold, the fuel server 100 may indicate that the powered asset 120 needs to be fueled (Block 715 of FIG. 7). For example, the fuel server 100 may logically place the powered asset 120 (e.g., the powered asset ID) in a fueling queue of powered assets 120 that need to be fueled. As described above, a variety of other techniques and approaches may also be used.

b. Identifying Powered Assets

In one embodiment, in response to (e.g., after) the fuel server 100 indicating that one or more powered assets 120 need fuel (Block 715 of FIG. 7), the fuel server 100 may begin monitoring the location of the one or more powered assets 120, for example, that need fuel (e.g., the location of powered assets 120 with powered asset IDs in the fueling queue). In one embodiment, as part of the monitoring, the fuel server 100 can determine whether a powered asset 120 is proximate (e.g., partially within) a geofence defined around one of the mobile fueling units 110 (Block 720 of FIG. 7). Similarly, in another embodiment, the fuel server 100 can determine whether one of the mobile fueling units 110 is within a geofence defined around a powered asset 120 that needs fuel (Block 720 of FIG. 7). In one embodiment, the fuel server 100 may make such determinations on a routine, periodic, and/or continuous basis. In another embodiment, the fuel server 100 may make such determinations in response to certain triggers, such as each time the fuel server 100 receives an update regarding the location of (a) a powered asset 120 that needs fuel and/or (b) a mobile fueling unit 110.

In one embodiment, to assist mobile fueling unit operators in identifying powered assets 120 that need fuel within close proximity (e.g., within a defined geofence), the fuel server 100 can transmit an instruction (e.g., a command or message) to the appropriate powered assets 120 (e.g., powered asset computing devices and/or powered asset telematics devices) to cause them to emit one or more perceivable indications (Block 725 of FIG. 7). Emitting a perceivable indication may include causing (a) a beacon to activate on a powered asset 120, (b) lights to flash on a powered asset 120, and/or (c) causing a horn to honk on a powered asset 120. Such perceivable indications can assist mobile fueling unit operators in identifying powered assets 120 that need fuel within their proximity. By emitting such perceivable indications, mobile fueling unit operators can easily identify powered assets 120 that need fuel. The foregoing examples are provided for illustrative purposes only and should not be taken in any way as limiting embodiments of the present invention to the examples provided.

In one embodiment, in addition to transmitting an instruction to cause powered assets 120 to emit perceivable indications, the fuel server 100 can transmit information identifying the powered assets 120 that need fuel to the mobile fueling unit 110 (e.g., mobile fueling unit computing device and/or mobile fueling unit telematics device). The appropriate mobile fueling unit device can then cause display of the information identifying the powered assets 120 to the mobile fueling unit operator.

In one embodiment, after the operator fills the fuel tank of a powered asset 120, the fuel server 100 or the mobile fueling unit 110 (e.g., mobile fueling unit computing device and/or mobile fueling unit telematics device) can transmit an instruction (e.g., a command or message) to the appropriate powered asset 120 (e.g., powered asset computing devices and/or powered asset telematics devices) to cause it to stop emitting the one or more perceivable indications. As will be recognized, a variety of other approaches and techniques can also be used.

c. Authenticating for Dispensing Fuel

In one embodiment, before fuel can be dispensed into a powered asset 120, for example, the powered asset 120 can be authenticated.

Example 1

Authenticating for Mobile Dispensing of Fuel

In one embodiment, a mobile fueling unit operator may fuel a powered asset 120 that is emitting a perceivable indication. For example, if a mobile fueling unit operator is driving or walking a mobile fueling unit 110 along a row of powered assets 120, the powered assets 120 that need fuel may emit perceivable indications when they are within a geofence defined around the mobile fueling unit 110. The mobile fueling unit operator may then begin the fueling process for any such powered assets 120.

In one embodiment, as part of the fueling process, the powered asset 120 may be authenticated before fuel can be dispensed. To authenticate a powered asset 120, the mobile fueling unit operator may physically contact a data carrier associated with the mobile fueling unit 110 with a data receiver/receptacle associated with the powered asset 120. In response to (e.g., after) the data carrier making physical contact with the data receiver/receptacle, the data receiver/receptacle can pass an electrical signal to the data carrier. The electrical signal can cause the data carrier to transmit a unique identifier (e.g., a data carrier ID or a mobile fueling unit ID) to the data receiver/receptacle (Block 800 of FIG. 8). The data receiver/receptacle can then transmit the unique identifier to the associated powered asset 120 (e.g., powered asset computing device and/or powered asset telematics device). The powered asset 120 (e.g., powered asset computing device and/or powered asset telematics device) can receive the unique identifier, and in response (e.g., after), transmit its corresponding powered asset ID to the fuel server 100 (Block 805 of FIG. 8). Alternatively, the powered asset 120 (e.g., powered asset computing device and/or powered asset telematics device) can transmit its corresponding powered asset ID to the mobile fueling unit 110 (e.g., mobile fueling unit computing device and/or mobile fueling unit telematics device) for transmission to the fuel server 100 (Block 805 of FIG. 8). The transmission of the powered asset ID may also include a variety of other information, such as time stamps, fueling unit ID, telematics data, and/or the like.

In one embodiment, the fuel server 100 may receive the powered asset ID (and other data) and determine whether the powered asset 120 associated with the powered asset ID is authorized to receive fuel (Block 810 of FIG. 8). For example, this determination may simply involve determining whether the powered asset ID is stored within a database that includes all powered asset IDs.

As indicated, the fuel server 100 (e.g., database 240) may maintain the allowed fuel type associated with each powered asset 120. In the event that communication with the fuel server 100 is not possible, the powered asset 120 may communicate with the mobile fueling unit 110. The mobile fueling unit 110 may also contain a database of valid powered asset IDs.

In another embodiment, the mobile fueling units 110 and fixed fueling units 115 may provide a mechanism to manually fuel powered assets 120 if the database, for example, becomes corrupt or if the powered asset ID is not in the database. In such a case, all powered asset IDs may be unique, but comprise a preface sequence that can be used to authorize fuel delivery. For example, if the powered asset associated with powered asset ID "1221A445533AS445" is requesting fuel, the mobile fueling unit 110 and/or fixed fueling unit 115 can check the fuel server 100 (or database) for the appropriate authorization. If the corresponding powered asset ID is not found, the mobile fueling unit 110 and/or fixed fueling unit 115 can check the first 4 digits of the powered asset ID to determine whether they match a preface sequence. If they match a preface sequence (e.g., such as two or three different codes (1221, 1222, 1223)), fuel can be dispensed in "override mode." In one embodiment, the fueling operator may have to enter a password to allow operation in override mode. In another embodiment, the operator can also put the mobile fueling unit 110 and/or the fixed fueling unit 115 in full manual mode, which may not require authorization to dispense fuel.

In one embodiment, in response to (e.g., after) the fuel server 100 determining that the powered asset 120 associated with the powered asset ID is not authorized to receive fuel, the fuel server 100 can transmit a notification to the mobile fueling unit 110 (e.g., mobile fueling unit computing device and/or mobile fueling unit telematics device) and/or the powered asset 120 (e.g., powered asset computing device and/or powered asset telematics device) indicating that the powered asset 120 is not authorized to receive fuel from the mobile fueling unit 110 (Block 815 of FIG. 8). Such notifications may include a variety of information, including the powered asset ID associated with the unauthorized powered asset 120. The powered asset 120 (e.g., powered asset computing device and/or powered asset telematics device) may then transmit the notification (or a similar notification) to the mobile fueling unit 110 (e.g., mobile fueling unit computing device and/or mobile fueling unit telematics device). In response to (e.g., after) receiving such a notification, the mobile fueling unit 110 (e.g., mobile fueling unit computing device and/or mobile fueling unit telematics device) would not release a controller on the mobile fueling unit 110 so the operator would be unable to dispense fuel to the powered asset 120.

In response to (e.g., after) the fuel server 100 determining that the powered asset 120 associated with the powered asset ID is authorized to receive fuel, the fuel server 100 can transmit a notification to the powered asset 120 (e.g., powered asset computing device and/or powered asset telematics device) indicating that the powered asset 120 is authorized to receive fuel from the mobile fueling unit 110 (Block 820 of FIG. 8). Such notifications may include a variety of information, including the powered asset ID associated with the authorized powered asset 120. The powered asset 120 (e.g., powered asset computing device and/or powered asset telematics device) may then transmit the notification (or a similar notification) to the mobile fueling unit 110 (e.g., mobile fueling unit computing device and/or mobile fueling unit telematics device). In response to (e.g., after) receiving such a notification, the mobile fueling unit 110 (e.g., mobile fueling unit computing device and/or mobile fueling unit telematics device) can release a controller on the mobile fueling unit 110 to allow the operator to dispense fuel to the powered asset 120.

In another embodiment, in response to (e.g., after) the fuel server 100 determining that the powered asset 120 associated with the powered asset ID is authorized to receive fuel, the fuel server 100 can transmit a notification directly to the mobile fueling unit 110 (e.g., mobile fueling unit computing device and/or mobile fueling unit telematics device) indicating that the powered asset is authorized to receive fuel from the mobile fueling unit 110 (Block 820 of FIG. 8). Thus, in this example, in response to (e.g., after) receiving such a notification, the mobile fueling unit 110 (e.g., mobile fueling unit computing device and/or mobile fueling unit telematics device) can release a controller on the mobile fueling unit 110 to allow the operator to dispense fuel to the powered asset 120.

As (or after) fuel is dispensed, the mobile fueling unit 110 (e.g., mobile fueling unit computing device and/or mobile fueling unit telematics device) can transmit fueling data to the fuel server 100 (Block 825 of FIG. 8). The fueling data may indicate the amount of fuel dispensed, the type of fuel dispensed, the time the fuel was dispensed, the fueling unit ID, the powered asset ID for the powered asset 120 that was fueled, and/or the like. In response to (e.g., after) receiving the fueling data, if necessary, the fuel server 100 can reset the calculations for the corresponding powered asset 120 and continue monitoring its fuel consumption. The nozzle on the mobile fueling unit 110 may then be deactivated, for example, requiring another authentication before additional fuel can be dispensed from the nozzle.

As described, after the operator fills the fuel tank of a powered asset 120, the fuel server 100 or the mobile fueling unit 110 (e.g., mobile fueling unit computing device and/or mobile fueling unit telematics device) can transmit an instruction (e.g., a command or message) to the appropriate powered asset 120 (e.g., powered asset computing devices and/or powered asset telematics devices) to cause it to stop emitting the one or more perceivable indications.

Example 2

Authenticating for Mobile Dispensing of Fuel (Predetermined Range)

As described, a mobile fueling unit operator may fuel a powered asset 120 that is emitting a perceivable indication. In one embodiment, a powered asset operator may fuel a powered asset 120 using a mobile fueling unit 110. In one embodiment, as part of the fueling process, the powered asset 120 may be authenticated before fuel can be dispensed, e.g., as described above. For authentication, the fuel server 100 can then determine whether the powered asset 120 is within a predetermined range (e.g., a geofence of 2-3 meters) of the mobile fueling unit 110.

In one embodiment, in response to (e.g., after) the fuel server 100 determining that the powered asset 120 is not within a predetermined range (e.g., a geofence of 2-3 meters) of the mobile fueling unit 110, for example, the fuel server 100 can transmit a notification to the mobile fueling unit 110 (e.g., mobile fueling unit computing device and/or mobile fueling unit telematics device) indicating that the powered asset is not authorized to receive fuel from the mobile fueling unit 110 (Block 815 of FIG. 8). In response to (e.g., after) receiving such a notification, the mobile fueling unit 110 (e.g., mobile fueling unit computing device and/or mobile fueling unit telematics device) would not release a controller on the mobile fueling unit 110 so the operator would be unable to dispense fuel to the powered asset 120.

In one embodiment, in response to (e.g., after) the fuel server 100 determining that the powered asset 120 is within a predetermined range (e.g., a geofence of 2-3 meters) of the mobile fueling unit 110, for example, the fuel server 100 can transmit a notification to the mobile fueling unit 110 (e.g., mobile fueling unit computing device and/or mobile fueling unit telematics device) indicating that the powered asset is authorized to receive fuel from the mobile fueling unit 110 (Block 820 of FIG. 8). In response to (e.g., after) receiving such a notification, the mobile fueling unit 110 (e.g., mobile fueling unit computing device and/or mobile fueling unit telematics device) can release a controller on the mobile fueling unit 110 to allow the operator to dispense fuel to the powered asset 120.

As (or after) fuel is dispensed, the mobile fueling unit 110 (e.g., mobile fueling unit computing device and/or mobile fueling unit telematics device) can transmit fueling data to the fuel server 100 (Block 825 of FIG. 8). The fueling data may indicate the amount of fuel dispensed, the type of fuel dispensed, the time the fuel was dispensed, the fueling unit ID, the powered asset ID for the powered asset 120 that was fueled, and/or the like. In response to (e.g., after) receiving the fueling data, if necessary, the fuel server 100 can reset the calculations for the corresponding powered asset 120 and continue monitoring its fuel consumption. The nozzle on the mobile fueling unit 110 may then be deactivated, for example, requiring another authentication before additional fuel can be dispensed from the nozzle.

As described, after the operator fills the fuel tank of a powered asset 120, the fuel server 100 or the mobile fueling unit 110 (e.g., mobile fueling unit computing device and/or mobile fueling unit telematics device) can transmit an instruction (e.g., a command or message) to the appropriate powered asset 120 (e.g., powered asset computing devices and/or powered asset telematics devices) to cause it to stop emitting the one or more perceivable indications.

Example 3

Authenticating for Fixed Dispensing of Fuel

In one embodiment, a powered asset operator may fuel a powered asset 120 using a fixed fueling unit 115. For example, a powered asset operator may drive, walk, or otherwise transport a powered asset 120 to a fixed fueling unit 115. The powered asset operator may then begin the fueling process for the powered asset 120.

In one embodiment, as part of the fueling process, the powered asset 120 may be authenticated before fuel can be dispensed. To authenticate the powered asset 120, the powered asset operator may physically contact a data carrier associated with the fixed fueling unit 115 with a data receiver/receptacle associated with the powered asset 120. In response to (e.g., after) the data carrier making physical contact with the data receiver/receptacle, the data receiver/receptacle can pass an electrical signal to the data carrier. The electrical signal can cause the data carrier to transmit a unique identifier (e.g., a data carrier ID or a fixed fueling unit ID) to the data receiver/receptacle (Block 800 of FIG. 8). The data receiver/receptacle can then transmit the unique identifier to the associated powered asset 120 (e.g., powered asset computing device and/or powered asset telematics device). The powered asset 120 (e.g., powered asset computing device and/or powered asset telematics device) can receive the unique identifier, and in response (e.g., after), transmit its corresponding powered asset ID to the fuel server 100 (Block 805 of FIG. 8). Alternatively, the powered asset 120 (e.g., powered asset computing device and/or powered asset telematics device) can transmit its corresponding powered asset ID to the fixed fueling unit 115 (e.g., fixed fueling unit computing device and/or fixed fueling unit telematics device) for transmission to the fuel server 100 (Block 805 of FIG. 8). The transmission of the powered asset ID may also include a variety of other information, such as time stamps, fueling unit ID, telematics data, and/or the like.

In one embodiment, the fuel server 100 may receive the powered asset ID (and other data) and determine whether the powered asset 120 associated with the powered asset ID is authorized to receive fuel (Block 810 of FIG. 8). As described above, this determination may simply involve determining whether the powered asset ID is stored within a database that includes all powered asset IDs.

In one embodiment, in response to (e.g., after) the fuel server 100 determining that the powered asset 120 associated with the powered asset ID is not authorized to receive fuel, the fuel server 100 can transmit a notification to the fixed fueling unit 115 (e.g., fixed fueling unit computing device and/or fixed fueling unit telematics device) and/or the powered asset 120 (e.g., powered asset computing device and/or powered asset telematics device) indicating that the powered asset 120 is not authorized to receive fuel from the fixed fueling unit 115 (Block 815 of FIG. 8). As described, such notifications may include a variety of information, including the powered asset ID associated with the unauthorized powered asset 120. The powered asset 120 (e.g., powered asset computing device and/or powered asset telematics device) may then transmit the notification (or a similar notification) to the fixed fueling unit 115 (e.g., fixed fueling unit computing device and/or fixed fueling unit telematics device). In response to (e.g., after) receiving such a notification, the fixed fueling unit 115 (e.g., fixed fueling unit computing device and/or fixed fueling unit telematics device) would not release a controller on the fixed fueling unit 115 so the operator would be unable to dispense fuel to the powered asset 120.

In response to (e.g., after) the fuel server 100 determining that the powered asset 120 associated with the powered asset ID is authorized to receive fuel, the fuel server 100 can transmit a notification to the powered asset 120 (e.g., powered asset computing device and/or powered asset telematics device) indicating that the powered asset is authorized to receive fuel from the fixed fueling unit 115 (Block 820 of FIG. 8). The powered asset 120 (e.g., powered asset computing device and/or powered asset telematics device) may then transmit the notification (or a similar notification) to the fixed fueling unit 115 (e.g., fixed fueling unit computing device and/or fixed fueling unit telematics device). In response to (e.g., after) receiving such a notification, the fixed fueling unit 115 (e.g., fixed fueling unit computing device and/or fixed fueling unit telematics device) can release a controller on the fixed fueling unit 115 to allow the operator to dispense fuel to the powered asset 120.

In another embodiment, in response to (e.g., after) the fuel server 100 determining that the powered asset 120 associated with the powered asset ID is authorized to receive fuel, the fuel server 100 can transmit a notification directly to the fixed fueling unit 115 (e.g., fixed fueling unit computing device and/or fixed fueling unit telematics device) indicating that the powered asset is authorized to receive fuel from the fixed fueling unit 115 (Block 820 of FIG. 8). Thus, in this example, in response to (e.g., after) receiving such a notification, the fixed fueling unit 115 (e.g., fixed fueling unit computing device and/or fixed fueling unit telematics device) can release a controller on the fixed fueling unit 115 to allow the operator to dispense fuel to the powered asset 120.

As (or after) fuel is dispensed, the fixed fueling unit 115 (e.g., fixed fueling unit computing device and/or fixed fueling unit telematics device) can transmit fueling data to the fuel server 100 (Block 825 of FIG. 8). The fueling data may indicate the amount of fuel dispensed, the type of fuel dispensed, the time the fuel was dispensed, the fueling unit ID, the powered asset ID for the powered asset 120 that was fueled, and/or the like. In response to (e.g., after) receiving the fueling data, if necessary, the fuel server 100 can reset the calculations for the corresponding powered asset 120 and continue monitoring its fuel consumption. The nozzle on the fixed fueling unit 115 may then be deactivated, for example, requiring another authentication before additional fuel can be dispensed from the nozzle.

As described, after the operator fills the fuel tank of a powered asset 120, the fuel server 100 or the fixed fueling unit 115 (e.g., fixed fueling unit computing device and/or fixed fueling unit telematics device) can transmit an instruction (e.g., a command or message) to the appropriate powered asset 120 (e.g., powered asset computing devices and/or powered asset telematics devices) to cause it to stop emitting the one or more perceivable indications.

Example 4

Authenticating for Fixed Dispensing of Fuel
(Predetermined Range)

In one embodiment, a powered asset operator may fuel a powered asset 120 using a fixed fueling unit 115. In one embodiment, as part of the fueling process, the powered asset 120 may be authenticated before fuel can be dispensed. For example, the fuel server 100 can determine which fixed fueling unit 115 to authorize to dispense fuel to the powered asset 120 based on the known location of the powered asset 120 in relation to know locations of fixed fueling units 115. The fuel server 100 can then determine whether the powered asset 120 is within a predetermined range (e.g., a geofence of 2-3 meters) of the fixed fueling unit 115. In the event there are multiple pump handles within the immediate area of the powered asset's geofence (e.g., a geofence of 2-3 meters), the operator may be prompted by the fixed fueling unit interface to select a grade/type of fuel, which can be used to notify the fuel server 100 and/or controller of the appropriate pump handle to activate.

In one embodiment, in response to (e.g., after) the fuel server 100 determining that the powered asset 120 is not within a predetermined range (e.g., a geofence of 2-3 meters) of the fixed fueling unit 115, for example, the fuel server 100 can transmit a notification to the fixed fueling unit 115 (e.g., fixed fueling unit computing device and/or fixed fueling unit telematics device) indicating that the powered asset is not authorized to receive fuel from the fixed fueling unit 115 (Block 815 of FIG. 8). In response to (e.g., after) receiving such a notification, the fixed fueling unit 115 (e.g., fixed fueling unit computing device and/or fixed fueling unit telematics device) would not release a controller on the fixed fueling unit 115 so the operator would be unable to dispense fuel to the powered asset 120.

In one embodiment, in response to (e.g., after) the fuel server 100 determining that the powered asset 120 is within the predetermined range, for example, of the fixed fueling unit 115, the fuel server 100 can transmit a notification to the fixed fueling unit 115 (e.g., fixed fueling unit computing device and/or fixed fueling unit telematics device) indicating that the powered asset is authorized to receive fuel from the fixed fueling unit 115 (Block 820 of FIG. 8). In response to (e.g., after) receiving such a notification, the fixed fueling unit 115 (e.g., fixed fueling unit computing device and/or fixed fueling unit telematics device) can release a controller on the fixed fueling unit 115 to allow the operator to dispense fuel to the powered asset 120.

In one embodiment, as (or after) fuel is dispensed, the fixed fueling unit 115 (e.g., fixed fueling unit computing device and/or fixed fueling unit telematics device) can transmit fueling data to the fuel server 100 (Block 825 of FIG. 8). The fueling data may indicate the amount of fuel dispensed, the type of fuel dispensed, the time the fuel was dispensed, the fueling unit ID, the powered asset ID for the powered asset 120 that was fueled, and/or the like. In response to (e.g., after) receiving the fueling data, if necessary, the fuel server 100 can reset the calculations for the corresponding powered asset 120 and continue monitoring its fuel consumption. The nozzle on the fixed fueling unit 115 may then be deactivated, for example, requiring another authentication before additional fuel can be dispensed from the nozzle.

As described, after the operator fills the fuel tank of a powered asset 120, the fuel server 100 or the fixed fueling unit 115 (e.g., fixed fueling unit computing device and/or fixed fueling unit telematics device) can transmit an instruction (e.g., a command or message) to the appropriate powered asset 120 (e.g., powered asset computing devices and/or powered asset telematics devices) to cause it to stop emitting the one or more perceivable indications.

IV. Conclusion

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for authenticating powered assets for fueling comprising:
    providing a unique identifier associated with a fueling unit to a data receptacle associated with a powered asset from physical contact of a data carrier associated with the fueling unit with the data receptacle;
    after the unique identifier is provided, determining, via one or more processors, whether the powered asset associated with a powered asset identifier is authorized to receive fuel; and
    after determining that the powered asset associated with the powered asset identifier is authorized to receive fuel, transmitting, via the one or more processors, a notification indicating that the powered asset is authorized to receive fuel.

2. The method of claim 1, wherein (a) the unique identifier is received by the data receptacle and transmitted from the data receptacle to a powered asset computing device associated with the powered asset and (b) the powered asset identifier is transmitted from the powered asset computing device to the fuel server.

3. The method of claim 2, wherein (1) the notification (a) is transmitted from the fuel server to the powered asset computing device and (b) is transmitted from the powered asset computing device to a fueling unit computing device associated with the fueling unit and (2) after receiving the notification, the fueling unit computing device allows fuel to be dispensed to the powered asset.

4. The method of claim 1, wherein (1) the unique identifier is received by the data receptacle and transmitted from the data receptacle to a powered asset computing device associated with the powered asset and (2) the powered asset identifier is (a) transmitted from the powered asset computing device to a fueling unit computing device associated with the fueling unit and (b) transmitted by the fueling unit computing device to the fuel server.

5. The method of claim 4, wherein (a) the notification is transmitted from the fuel server to the fueling unit computing device and (b) after receiving the notification, the fueling unit computing device allows fuel to be dispensed to the powered asset.

6. The method of claim 4, wherein the fueling unit is a mobile fueling unit.

7. The method of claim 4, wherein the fueling unit is a fixed fueling unit.

8. The method of claim 1 (a) further comprising receiving, via the fuel server, the powered asset identifier associated with the powered asset and (b) wherein the fuel server electronically determines whether the powered asset associated with the powered asset identifier is authorized to receive fuel.

9. The method of claim 8 further comprising:
determining an estimated amount of fuel dispensed to the powered asset; and
transmitting the estimated amount of fuel dispensed to the powered asset to the fuel server.

10. A system comprising a fuel server, a fueling unit computing device associated with a fueling unit, and a powered asset computing device associated with a powered asset, the system configured to:
provide a unique identifier associated with a fueling unit to a data receptacle associated with a powered asset from physical contact of a data carrier associated with the fueling unit with the data receptacle;
after the unique identifier is provided, electronically determine whether the powered asset associated with a powered asset identifier is authorized to receive fuel; and
after determining that the powered asset associated with the powered asset identifier is authorized to receive fuel, transmit a notification indicating that the powered asset is authorized to receive fuel.

11. The system of claim 10, wherein (a) the unique identifier is received by the data receptacle and transmitted from the data receptacle to the powered asset computing device and (b) the powered asset identifier is transmitted from the powered asset computing device to the fuel server.

12. The system of claim 11, wherein (1) the notification (a) is transmitted from the fuel server to the powered asset computing device and (b) is transmitted from the powered asset computing device to the fueling unit computing device and (2) after receiving the notification, the fueling unit computing device allows fuel to be dispensed to the powered asset.

13. The system of claim 10, wherein (1) the unique identifier is received by the data receptacle and transmitted from the data receptacle to the powered asset computing device and (2) the powered asset identifier is (a) transmitted from the powered asset computing device to the fueling unit computing device and (b) transmitted by the fueling unit computing device to the fuel server.

14. The system of claim 13, wherein (a) the notification is transmitted from the fuel server to the fueling unit computing device and (b) after receiving the notification, the fueling unit computing device allows fuel to be dispensed to the powered asset.

15. The system of claim 14, wherein the fueling unit is a mobile fueling unit.

16. The system of claim 14, wherein the fueling unit is a fixed fueling unit.

17. The system of claim 10 (a) further configured to receive, via the fuel server, the powered asset identifier associated with the powered asset and (b) wherein the fuel server electronically determines whether the powered asset associated with the powered asset identifier is authorized to receive fuel.

18. The system of claim 17 further configured to:
determine an estimated amount of fuel dispensed to the powered asset; and
transmit the estimated amount of fuel dispensed to the powered asset to the fuel server.

* * * * *